United States Patent
Nishioka et al.

(10) Patent No.: US 9,108,153 B2
(45) Date of Patent: *Aug. 18, 2015

(54) EXHAUST PURIFICATION SYSTEM OF INTERNAL COMBUSTION ENGINE

(75) Inventors: Hiromasa Nishioka, Susono (JP); Kohei Yoshida, Gotenba (JP); Yoshihisa Tsukamoto, Susono (JP); Yuki Bisaiji, Mishima (JP); Junichi Matsuo, Susono (JP); Takamitsu Asanuma, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 54 days.

This patent is subject to a terminal disclaimer.

(21) Appl. No.: 13/257,789

(22) PCT Filed: Jul. 28, 2010

(86) PCT No.: PCT/JP2010/063135
§ 371 (c)(1),
(2), (4) Date: Oct. 14, 2011

(87) PCT Pub. No.: WO2012/014330
PCT Pub. Date: Feb. 2, 2012

(65) Prior Publication Data
US 2013/0121885 A1  May 16, 2013

(51) Int. Cl.
*F01N 3/10* (2006.01)
*B01D 53/94* (2006.01)
(Continued)

(52) U.S. Cl.
CPC ........ *B01D 53/9422* (2013.01); *B01D 53/9409* (2013.01); *F01N 3/0814* (2013.01);
(Continued)

(58) Field of Classification Search
None
See application file for complete search history.

(56) References Cited

U.S. PATENT DOCUMENTS 5,052,178 A   10/1991   Clerc et al.
5,057,483 A   10/1991   Wan
(Continued)

FOREIGN PATENT DOCUMENTS

CN   101454081 A   6/2009
CN   101600860 A   12/2009
(Continued)

OTHER PUBLICATIONS

Office Action dated Apr. 23, 2014 issued in U.S. Appl. No. 13/260,986.
(Continued)

*Primary Examiner* — Walter D Griffin
*Assistant Examiner* — Jelitza Perez
(74) *Attorney, Agent, or Firm* — Oliff PLC

(57) ABSTRACT

In an internal combustion engine, inside of an engine exhaust passage, a hydrocarbon feed valve (15) and an exhaust treatment catalyst (13) are arranged. On a substrate (45) of the exhaust treatment catalyst (13), a coat layer comprised of at least two layers of a top coat layer (46) and a bottom coat layer (47) is formed. The top coat layer (46) is comprised of an exhaust purification catalyst for reacting $NO_x$ contained in exhaust gas and reformed hydrocarbons, while the bottom coat layer (47) is comprised of an $NO_x$ absorption catalyst. The concentration of hydrocarbons which flows into the exhaust treatment catalyst (13) is made to vibrate within a predetermined range of amplitude and within a predetermined range of period. Due to this, $NO_x$ contained in exhaust gas and $NO_x$ desorbed from the $NO_x$ absorption catalyst (47) are reduced in the exhaust purification catalyst (46).

10 Claims, 13 Drawing Sheets

(51) Int. Cl.
*F01N 3/08* (2006.01)
*F01N 3/28* (2006.01)

(52) U.S. Cl.
CPC ............... *F01N3/0842* (2013.01); *F01N 3/28* (2013.01); *B01D 2251/208* (2013.01); *B01D 2255/102* (2013.01); *B01D 2255/9022* (2013.01); *B01D 2255/91* (2013.01); *B01D 2255/912* (2013.01); *B01D 2258/012* (2013.01); *F01N 2240/30* (2013.01); *F01N 2430/06* (2013.01); *F01N 2510/0684* (2013.01)

(56) References Cited

U.S. PATENT DOCUMENTS

| | | |
|---|---|---|
| 5,075,274 A | 12/1991 | Kiyohide et al. |
| 5,402,641 A | 4/1995 | Katoh et al. |
| 5,882,607 A | 3/1999 | Miyadera et al. |
| 6,109,024 A | 8/2000 | Kinugasa et al. |
| 6,327,851 B1 | 12/2001 | Bouchez et al. |
| 6,413,483 B1 * | 7/2002 | Brisley et al. ............ 423/239.1 |
| 6,477,834 B1 | 11/2002 | Asanuma et al. |
| 6,667,018 B2 | 12/2003 | Noda et al. |
| 6,813,882 B2 | 11/2004 | Hepburn et al. |
| 6,854,264 B2 | 2/2005 | Elwart et al. |
| 6,877,311 B2 | 4/2005 | Uchida |
| 6,983,589 B2 | 1/2006 | Lewis et al. |
| 7,063,642 B1 | 6/2006 | Hu et al. |
| 7,073,325 B2 | 7/2006 | Nakatani et al. |
| 7,082,753 B2 | 8/2006 | Dalla Betta et al. |
| 7,111,456 B2 | 9/2006 | Yoshida et al. |
| 7,137,379 B2 | 11/2006 | Sasaki et al. |
| 7,146,800 B2 | 12/2006 | Toshioka et al. |
| 7,165,393 B2 | 1/2007 | Betta et al. |
| 7,299,625 B2 | 11/2007 | Uchida et al. |
| 7,332,135 B2 | 2/2008 | Gandhi et al. |
| 7,412,823 B2 | 8/2008 | Reuter et al. |
| 7,454,900 B2 | 11/2008 | Hayashi |
| 7,484,504 B2 | 2/2009 | Kato et al. |
| 7,506,502 B2 | 3/2009 | Nakano et al. |
| 7,549,284 B2 | 6/2009 | Iihoshi et al. |
| 7,703,275 B2 | 4/2010 | Asanuma et al. |
| 7,707,821 B1 | 5/2010 | Legare |
| 7,861,516 B2 | 1/2011 | Allansson et al. |
| 8,099,950 B2 | 1/2012 | Kojima et al. |
| 8,215,101 B2 | 7/2012 | Tsujimoto et al. |
| 8,261,532 B2 | 9/2012 | Fukuda et al. |
| 8,281,569 B2 | 10/2012 | Handa et al. |
| 8,434,296 B2 | 5/2013 | Wada et al. |
| 8,572,950 B2 | 11/2013 | Bisaiji et al. |
| 8,656,706 B2 | 2/2014 | Umemoto et al. |
| 8,671,667 B2 | 3/2014 | Bisaiji et al. |
| 8,679,410 B2 | 3/2014 | Umemoto et al. |
| 8,689,543 B2 | 4/2014 | Numata et al. |
| 8,695,325 B2 | 4/2014 | Bisaiji et al. |
| 2001/0052232 A1 | 12/2001 | Hoffmann et al. |
| 2002/0029564 A1 | 3/2002 | Roth et al. |
| 2002/0053202 A1 | 5/2002 | Akama et al. |
| 2003/0010020 A1 | 1/2003 | Taga et al. |
| 2003/0040432 A1 * | 2/2003 | Beall et al. ............... 502/332 |
| 2003/0101713 A1 | 6/2003 | Betta et al. |
| 2004/0045285 A1 | 3/2004 | Penetrante et al. |
| 2004/0050037 A1 | 3/2004 | Betta et al. |
| 2004/0055285 A1 | 3/2004 | Rohr et al. |
| 2004/0154288 A1 | 8/2004 | Okada et al. |
| 2004/0175305 A1 | 9/2004 | Nakanishi et al. |
| 2004/0187477 A1 | 9/2004 | Okugawa et al. |
| 2005/0135977 A1 | 6/2005 | Park et al. |
| 2005/0147541 A1 | 7/2005 | Ajisaka et al. |
| 2006/0053778 A1 | 3/2006 | Asanuma et al. |
| 2006/0107657 A1 | 5/2006 | Bernler et al. |
| 2006/0153761 A1 | 7/2006 | Bandl-Konrad et al. |
| 2006/0286012 A1 | 12/2006 | Socha et al. |
| 2007/0016357 A1 | 1/2007 | Nakagawa et al. |
| 2007/0028601 A1 | 2/2007 | Duvinage et al. |
| 2007/0059223 A1 | 3/2007 | Golunski et al. |
| 2007/0089403 A1 | 4/2007 | Pfeifer et al. |
| 2007/0125073 A1 | 6/2007 | Reuter et al. |
| 2007/0151232 A1 | 7/2007 | Dalla Betta et al. |
| 2008/0022662 A1 | 1/2008 | Yan |
| 2008/0053073 A1 | 3/2008 | Kalyanaraman et al. |
| 2008/0102010 A1 | 5/2008 | Bruck et al. |
| 2008/0120963 A1 | 5/2008 | Morita et al. |
| 2008/0148711 A1 | 6/2008 | Takubo |
| 2008/0154476 A1 | 6/2008 | Takubo |
| 2008/0196398 A1 | 8/2008 | Yan |
| 2008/0223020 A1 | 9/2008 | Yoshida et al. |
| 2008/0276602 A1 | 11/2008 | McCabe et al. |
| 2009/0000277 A1 | 1/2009 | Yoshida et al. |
| 2009/0049824 A1 | 2/2009 | Kojima et al. |
| 2009/0049825 A1 | 2/2009 | Ohashi |
| 2009/0049826 A1 | 2/2009 | Toshioka et al. |
| 2009/0077948 A1 | 3/2009 | Mondori et al. |
| 2009/0084091 A1 | 4/2009 | Tsujimoto et al. |
| 2009/0118121 A1 | 5/2009 | Sarai |
| 2009/0120072 A1 | 5/2009 | Dalla Betta et al. |
| 2009/0151332 A1 | 6/2009 | Toshioka et al. |
| 2009/0191108 A1 | 7/2009 | Blanchard et al. |
| 2009/0196811 A1 | 8/2009 | Yamashita et al. |
| 2009/0229251 A1 | 9/2009 | Kadowaki |
| 2009/0249768 A1 | 10/2009 | Asanuma et al. |
| 2009/0266057 A1 | 10/2009 | Tsujimoto et al. |
| 2009/0282809 A1 | 11/2009 | Toshioka |
| 2009/0288393 A1 | 11/2009 | Matsuno et al. |
| 2009/0313970 A1 | 12/2009 | Iida |
| 2010/0005873 A1 | 1/2010 | Katoh et al. |
| 2010/0055012 A1 | 3/2010 | Grisstede et al. |
| 2010/0107613 A1 | 5/2010 | Masuda et al. |
| 2010/0115923 A1 | 5/2010 | Tsujimoto et al. |
| 2010/0126148 A1 | 5/2010 | Morishima et al. |
| 2010/0132356 A1 | 6/2010 | Lee |
| 2010/0154387 A1 | 6/2010 | Shibata et al. |
| 2010/0233051 A1 | 9/2010 | Grisstede et al. |
| 2010/0236224 A1 | 9/2010 | Kumar et al. |
| 2010/0242459 A1 | 9/2010 | Tsujimoto et al. |
| 2011/0041486 A1 | 2/2011 | Kato et al. |
| 2011/0047984 A1 | 3/2011 | Lee et al. |
| 2011/0047988 A1 | 3/2011 | Lewis et al. |
| 2011/0113754 A1 | 5/2011 | Kohara et al. |
| 2011/0120100 A1 | 5/2011 | Yin et al. |
| 2011/0131952 A1 | 6/2011 | Onodera et al. |
| 2011/0173950 A1 | 7/2011 | Wan et al. |
| 2011/0209459 A1 | 9/2011 | Hancu et al. |
| 2012/0122660 A1 | 5/2012 | Andersen et al. |
| 2012/0124967 A1 | 5/2012 | Yang et al. |
| 2012/0124971 A1 | 5/2012 | Bisaiji et al. |
| 2012/0131908 A1 | 5/2012 | Bisaiji et al. |
| 2013/0000284 A1 | 1/2013 | Bisaiji et al. |
| 2013/0011302 A1 | 1/2013 | Bisaiji et al. |
| 2013/0022512 A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1544429 A1 | 6/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | A-2008-232003 | 7/1992 |
| JP | A-H08-117601 | 5/1996 |
| JP | A-09-004437 | 1/1997 |
| JP | A-09-220440 | 8/1997 |
| JP | A-11-30117 | 2/1999 |
| JP | A-11-062559 | 3/1999 |

(56) References Cited

FOREIGN PATENT DOCUMENTS

| | | |
|---|---|---|
| JP | A-11-081994 | 3/1999 |
| JP | A-2000-257419 | 9/2000 |
| JP | A-2002-188429 | 7/2002 |
| JP | A-2004-16850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 | 1/2008 |
| WO | WO 2009/7016822 | 2/2009 |
| WO | WO 2009/056958 | 5/2009 |
| WO | WO 2009/082035 | 7/2009 |
| WO | WO 2011/114499 | 9/2011 |
| WO | WO 2011/114501 | 9/2011 |
| WO | WO 2011/118044 | 9/2011 |

OTHER PUBLICATIONS

Oct. 26, 2010 International Search Report issued in International Patent Application No. PCT/JP2010/063135.
Office Action dated May 7, 2014 issued in U.S. Appl. No. 13/264,062.
Office Action dated Oct. 23, 2013 issued in U.S. Appl. No. 13/263,272.
Jan. 18, 2011 International Search Report issued in International Patent Application No. PCT/JP2010/068785.
Jan. 18, 2011 International Search Report issued in International Patent Application No. PCT/JP2010/067707.
Dec. 21, 2010 Search Report issued in International Patent Application No. PCT/JP2010/065449 (with translation).
Jan. 18, 2011 International Search Report issued in International Patent Application No. PCT/JP2010/067705.
U.S. Appl. No. 13/263,272 in the name of Bisaui et al., filed Oct. 6, 2011.
U.S. Appl. No. 13/264,062 in the name of Watanabe et al., filed Oct. 12, 2011.
U.S. Appl. No. 13/259,885 in the name of Umemoto et al., filed Sep. 23, 2011.
U.S. Appl. No. 13/260,986 in the name of Watanabe et al., filed Sep. 29, 2011.
Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Feb. 6, 2014 Corrected Notice of Allowability issued in U.S. Appl. No. 13/202,694.
Dec. 27, 2011 International Search Report issued in International Patent Application No. PCT/JP2011/075618 (with translation).
Jun. 15, 2010 International Search Report issued in International Patent Application No. PCT/JP2010/054730 (with translation).
Nov. 22, 2010 International Search Report issued in International Patent Application No. PCT/JP2010/065186 (with translation).
Jul. 14, 2014 Office Action issued in U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 21, 2011 International Search Report issued in International Patent Application No. PCT/JP2011/059880 (with translation).
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303 (with translation).
Mar. 15, 2011 International Search Report issued in International Patent Application No. PCT/JP2011/053429 (with translation).
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 15, 2013 Office Action in U.S. Appl. No. 13/202,694.
May 17, 2011 International Search Report issued in International Patent Application No. PCT/JP2011/057264 (with translation).
May 2, 2014 Office Action issued in Application No. 13/263,660.
Mar. 28, 2014 Notice of Allowance issued in U.S. Appl. No. 13/582,862.
Mar. 4, 2014 Notice of Allowance issued in U.S. Appl. No. 13/255,786.
Nov. 13, 2013 Notice of Allowance issued in U.S. Appl. No. 13/202,692.
Oct. 17, 2013 Notice of Allowance issued in U.S. Appl. No. 13/202,694.
Nov. 22, 2010 International Search Report issued in International Patent Application No. PCT/JP2010/065187.
Nov. 26, 2012 Office Action issued in U.S. Appl. No. 13/202,694.
Oct. 26, 2012 Office Action issued in U.S. Appl. No. 13/202,692.
Apr. 3, 2014 Office Action issued in U.S. Appl. No. 13/259,574.
Dec. 20, 2013 Office Action issued in U.S. Appl. No. 13/264,230.
Jul. 24, 2013 Office Action issued in U.S. Appl. No. 13/202,692.
May 8, 2014 Office Action issued in U.S. Appl. No. 13/375,674.
U.S. Appl. No. 13/202,692 in the name of Umemoto et al., filed Sep. 20, 2011.
U.S. Appl. No. 13/202,733 in the name of Bisaui et al., filed Sep. 30, 2011.
U.S. Appl. No. 13/258,483 in the name of Numata et al., filed Sep. 22, 2011.
U.S. Appl. No. 13/259,574 in the name of Tsukamoto et al., filed Sep. 23, 2011.
U.S. Appl. No. 13/262,858 in the name of Bisaiji et al., filed Oct. 4, 2011.
U.S. Appl. No. 13/263,660 in the name of Umemoto et al., filed Oct. 7, 2011.

(56) References Cited

OTHER PUBLICATIONS

U.S. Appl. No. 13/264,230 in the name of Bisadi et al., filed Oct. 13, 2011.
U.S. Appl. No. 13/264,594 in the name of Inoue et al., filed Oct. 14, 2011.
U.S. Appl. No. 13/264,884 in the name of Bisaiji et al., filed Oct. 17, 2011.
U.S. Appl. No. 13/375,674 in the name of Inoue et al., filed Dec. 1, 2011.
U.S. Appl. No. 13/578,148 in the name of Umemoto et al., filed Aug. 9, 2012.
U.S. Patent Application No. 13/58,186 in the name of Kazuhiro Umemoto et al., filed Aug. 24, 2012.
U.S. Appl. No. 13/580,000 in the name of Bisaiji et al., filed Aug. 20, 2012.
U.S. Appl. No. 13/582,862 in the name of Uenishi et al., filed Sep. 5, 2012.
U.S. Appl. No. 13/582,909 in the name of Kazuhiro Umemoto et al., filed Sep. 5, 2012.
U.S. Patent Application No. 131202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Nov. 22, 2010 Written Opinion issued in International Patent Application No. PCT/JP2010/065186 (with translation).
Dec. 27, 2011 Written Opinion issued in International Patent Application No. PCT/JP2011/075618.
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in PCT/JP2010/054740 (with translation).
Jun. 15, 2010 International Search Report issued in International Patent Application No. PCT/JP2010/054731 (with translation).
Jun. 29, 2010 International Search Report issued in International Patent Application No. PCT/JP2010/056345.
Jun. 15, 2010 International Search Report issued in International Patent Application No. PCT/JP2010/054729.
Sep. 13, 2011 International Search Report issued in International Patent Application No. PCT/JP2011/066628 (with translation).
Jun. 20, 2012 Search Report issued in European Patent Application No. 10845966.0.
Apr. 4, 2013 Office Action issued in U.S. Appl. No. 13/255,710.
Oct. 24, 2013 Office Action issued in U.S. Appl. No. 13/255,710.
Jan. 17, 2013 Office Action issued in U.S. Appl. No. 13/202,733.
Jan. 22, 2014 Office Action issued in U.S. Appl. No, 13/499,211.
May 27, 2014 Office Action issued in U.S. Appl. No. 13/255,710.
Oct. 2, 2014 Office Action issued in U.S. Appl. No. 13/582,862.
Jun. 15, 2010 Written Opinion issued in PCT/JP2010/054740 (with translation).
Sep. 18, 2014 Notice of Allowance issued in U.S. Appl. No. 13/255,710.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/255,774 in the name of Bisaiji et al., filed Sep. 22, 2011.
U,S. Appl. No. 13/255,710 in the name of Bisaiji et al., filed Oct. 12, 2011.
U.S. Appl. No. 13/502,210 in the name of Bisaiji et al., filed Apr. 16, 2012.
U.S. Appl. No. 13/499,211 in the name of Bisadi et al., filed Mar. 29, 2012.
U.S. Appl. No. 1.3/934,080 in the name of Bisaiji et al., filed Jul. 2, 2013.
U.S. Appl. No. 13/262,506 in the name of Bisaiji et al., filed Sep. 30, 2011.
U.S. Appl. No. 13/264,230 in the name of Bisaiji et al., filed Oct. 13, 2011.
U.S. Appl. No. 13/202,694 in the name of Bisaiji et al., filed Sep. 19, 2011.
U.S. Appl. No. 13/202,733 in the name of Bisaiji et al., filed Sep. 30, 2011.
Dec. 22, 2014 Office Action issued in U.S. Appl. No. 13/264,230.
Jun. 3, 2015 Office Action issued in U.S. Appl. No. 14/152,629.

\* cited by examiner

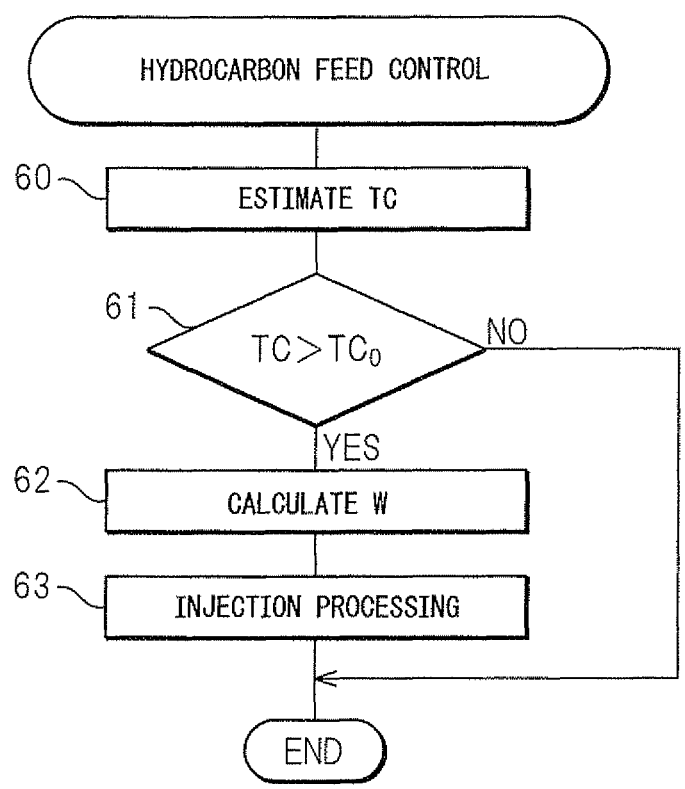

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

This $NO_x$ storage catalyst can give an excellent $NO_x$ purification rate if the catalyst is activated. However, there is the problem that when the $NO_x$ storage catalyst becomes a high temperature, the $NO_x$ purification rate falls.

An object of the present invention is to provide an exhaust purification system of an internal combustion engine which considers treatment for $NO_x$ before activation of an exhaust purification catalyst and which can give a high $NO_x$ purification rate even if the temperature of the exhaust purification catalyst becomes a high temperature.

Solution to Problem

According to the present invention, there is provided an exhaust purification system of an internal combustion engine in which an exhaust treatment catalyst is arranged inside of an engine exhaust passage, a coat layer comprised of at least two layers of a top coat layer and a bottom coat layer is formed on a substrate of the exhaust treatment catalyst, the top coat layer is comprised of an exhaust purification catalyst for reacting $NO_x$ contained in exhaust gas and reformed hydrocarbons, a precious metal catalyst is carried on an exhaust gas flow surface of he exhaust purification catalyst and a basic exhaust gas flow surface part is formed around the precious metal catalyst, the exhaust purification catalyst has a property of reducing the $NO_x$ which is contained in exhaust gas if causing vibration of a concentration of hydrocarbons flowing into the exhaust treatment catalyst by within a predetermined range of amplitude and within a predetermined range of period and has a property of being increased in storage amount of $NO_x$ which is contained in exhaust gas if lengthening the vibration period of the hydrocarbon concentration more than the predetermined range, the bottom coat layer is comprised of an $NO_x$ absorption catalyst which adsorbs $NO_x$ contained in exhaust gas and desorbs the adsorbed $NO_x$ if a temperature rises, at the time of engine operation, the concentration of hydrocarbons flowing into the exhaust treatment catalyst is made to vibrate within said predetermined range of amplitude and within said predetermined range of period and, thereby, $NO_x$ contained in exhaust gas and $NO_x$ desorbed from the $NO_x$ absorption catalyst are reduced.

Advantageous Effects of Invention

Even if the temperature of the exhaust purification catalyst becomes a high temperature, a high $NO_x$ purification rate can be obtained. Also, when the temperature of the exhaust purification catalyst is low, $NO_x$ which is contained in exhaust gas can be adsorbed at the $NO_x$ absorption catalyst.

BRIEF DESCRIPTION OF DRAWINGS

FIG. 20 is a view showing feed control of hydrocarbons.

DESCRIPTION OF EMBODIMENTS

Figure 1:
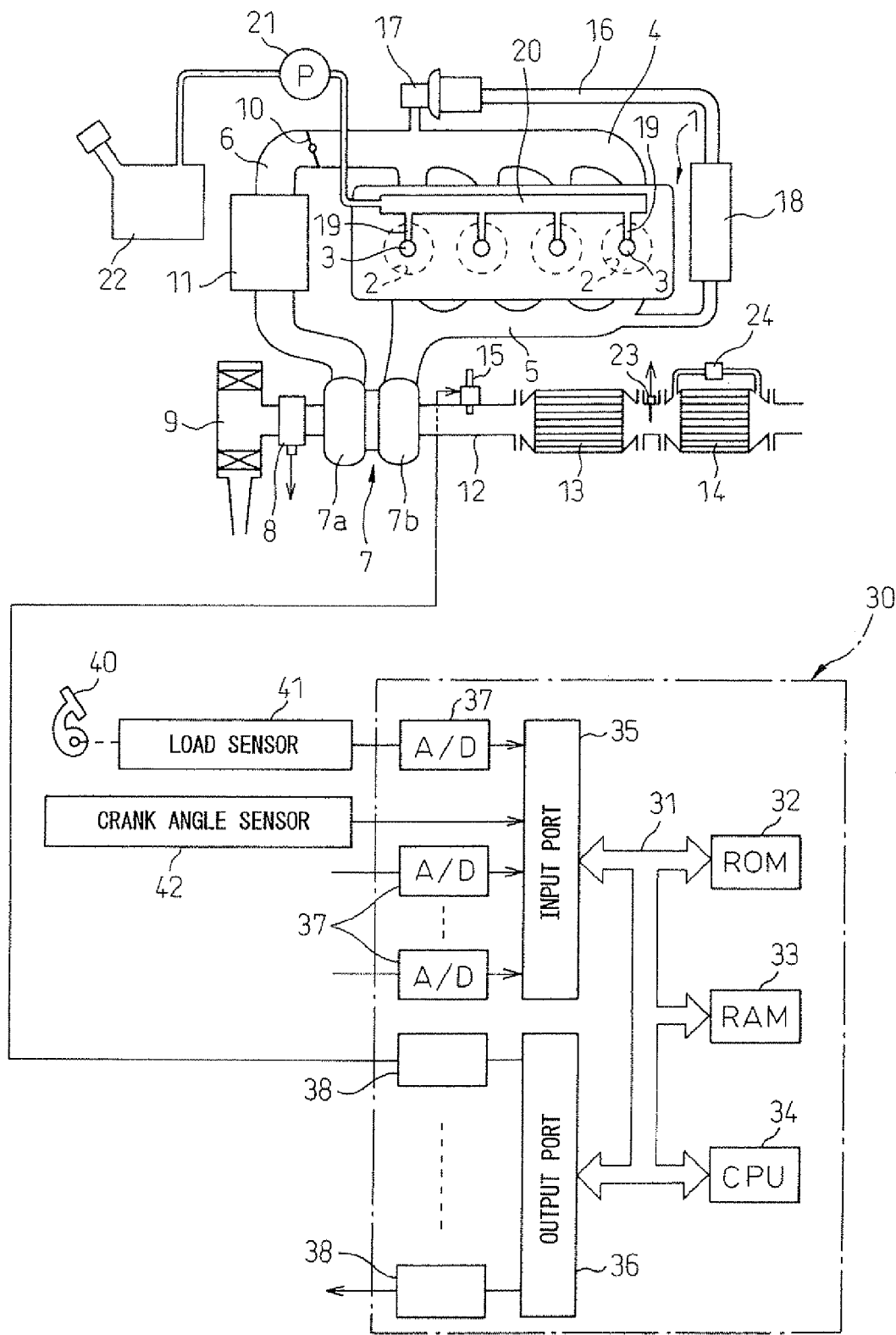
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust treatment catalyst 13, while the outlet of the exhaust treatment catalyst 13 is connected to a particulate filter 14 for trapping particulate which is contained in the exhaust gas. Inside the exhaust pipe 12 upstream of the exhaust treatment catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, a electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20, The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust treatment catalyst 13, a temperature sensor 23 is attached for detecting the exhaust gas temperature. The particulate filter 14 has a differential pressure sensor 24 attached for detecting the differential pressure before and after the particulate filter 14. The output signals of these temperature sensor 23, differential pressure sensor 24, and intake air amount detector 8 are input through corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2A:
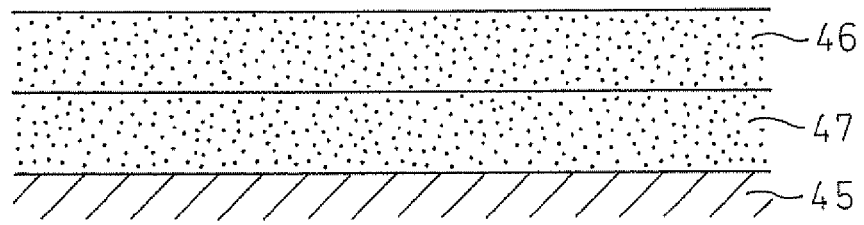
FIGS. 2A and 2B are views schematically showing a surface part of a catalyst.

FIG. 2A schematically shows a surface part of a substrate of the exhaust treatment catalyst 13. This substrate 45 is for example comprised of cordierite. On this substrate 45, a coat layer comprised of a least two layers of a top coat layer 46 and a bottom coat layer 47 is formed. In the embodiment shown in FIG. 2A, the top coat layer 46 is comprised of a powder aggregate. This top coat layer 46 forms an exhaust purification catalyst for removing $NO_x$. Therefore, first, this exhaust purification catalyst 46 and a new $NO_x$ purification method using this exhaust purification catalyst 46 will be explained.

Figure 2B:
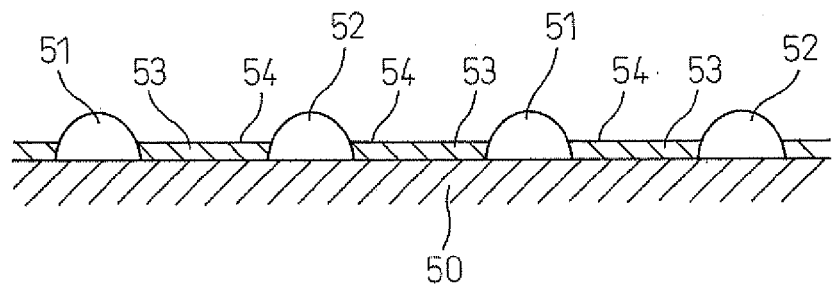

FIG. 2B schematically shows the surface part of the catalyst carrier of powders forming the exhaust purification catalyst 46. In this exhaust purification catalyst 46, as shown in FIG. 2B, for example, precious metal catalysts 51 and 52 are carried on a catalyst carrier 50 made of alumina. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 46. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 46, in addition to platinum Pt and rhodium Rh, palladium Pd may be further carried. Alternatively, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
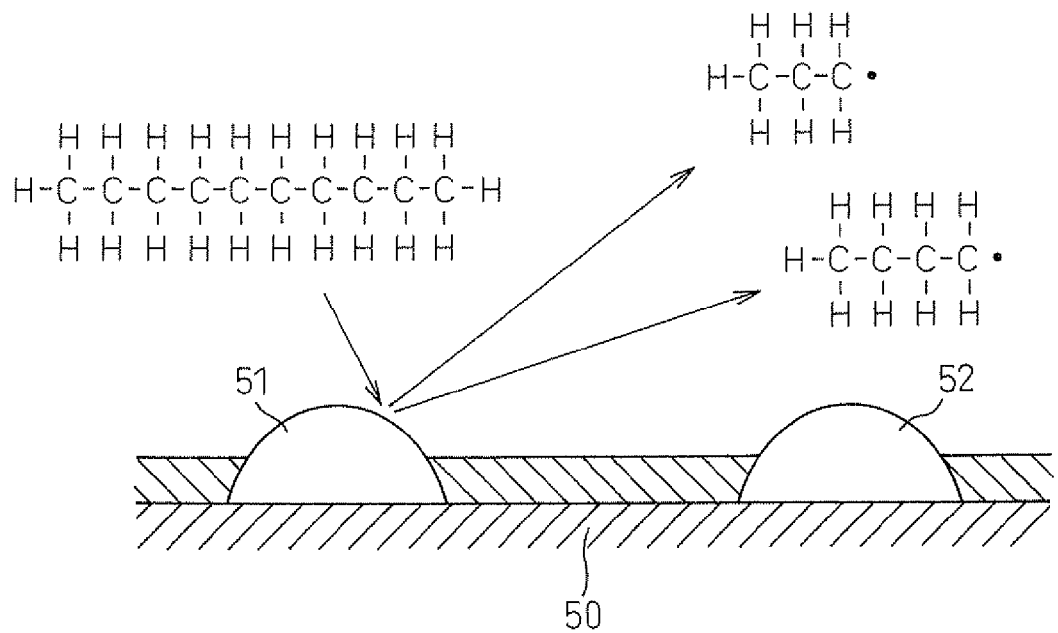
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 46. In the present invention, at this time, the reformed hydrocarbons are used to remove the $NO_x$ at the exhaust purification catalyst 46. FIG. 3 schematically shows the reforming action performed at the exhaust purification catalyst 46 at this time. As shown in FIG. 3, the hydrocarbons HC which are injected from the hydrocarbon feed valve 15 become radical hydrocarbons HC with a small carbon number by the catalyst 51.

Note that, even if injecting fuel, that is, hydrocarbons, from the fuel injector 3 into the combustion chamber 2 during the latter half of the expansion stroke or during the exhaust stroke, the hydrocarbons are reformed inside of the combustion chamber 2 or at the exhaust purification catalyst 46, and the $NO_x$ which is contained in the exhaust gas is removed by the modified hydrocarbons at the exhaust purification catalyst 46. Therefore, in the present invention, instead of feeding hydrocarbons from the hydrocarbon feed valve 15 to the inside of the engine exhaust passage, it is also possible to feed hydrocarbons into the combustion chamber 2 during the latter half of the expansion stroke or during the exhaust stroke. In this way, in the present invention, it is also possible to feed hydrocarbons to the inside of the combustion chamber 2, but below the present invention is explained taking as an example the case of injecting hydrocarbons from the hydrocarbon feed valve 15 to the inside of the engine exhaust passage.

Figure 4:
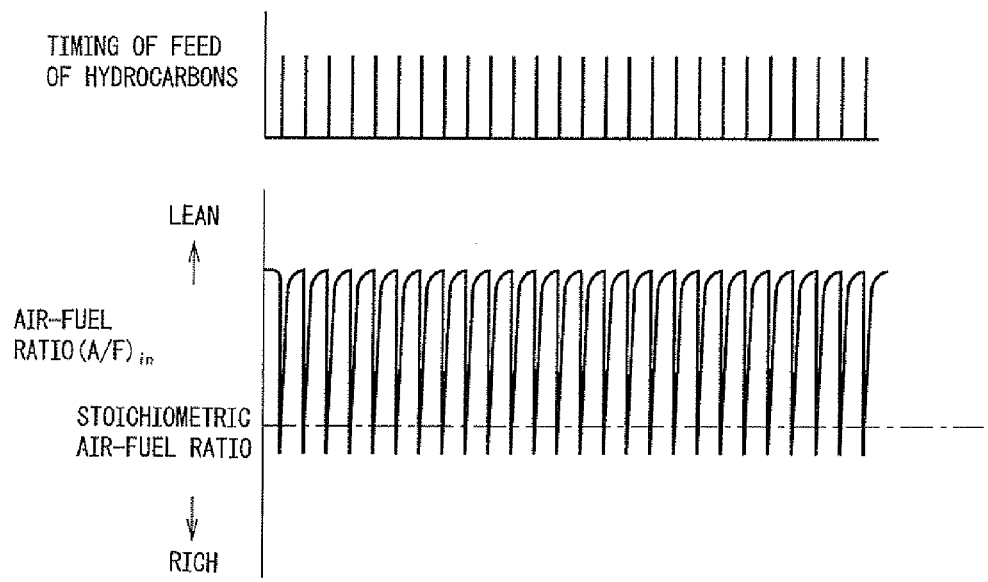
FIG. 4 is a view showing changes in the air-fuel ratio of the exhaust gas flowing into the exhaust treatment catalyst.

FIG. 4 shows the timing of feeding hydrocarbons from the hydrocarbon feed valve 15 and the changes in the air-fuel ratio (A/F)in of the exhaust gas flowing into the exhaust treatment catalyst 13. Note that, the changes in the air-fuel ratio (A/F)in depend on the change in concentration of the hydrocarbons in the exhaust gas which flows into the exhaust treatment catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
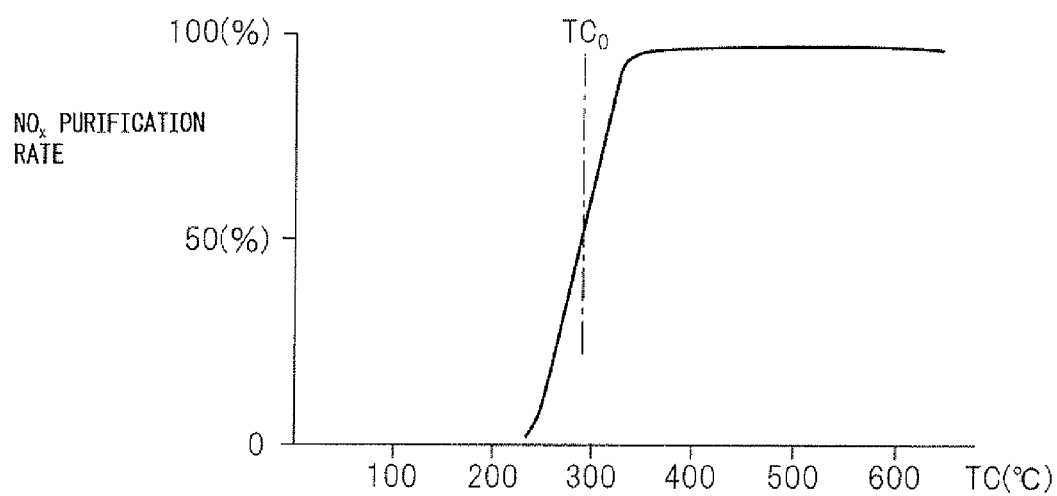
FIG. 5 is a view showing an $NO_x$ purification rate.

FIG. 5 shows the $NO_x$ purification rate by the exhaust treatment catalyst 13 with respect to the catalyst temperatures of the exhaust purification catalyst 46 when periodically making the concentration of hydrocarbons flowing into the exhaust treatment catalyst 13 change so as to, as shown in FIG. 4, make the air-fuel ratio (A/F)in of the exhaust gas flowing to the exhaust treatment catalyst 13 change. The inventors engaged in research relating to $NO_x$ purification for a long time. In the process of research, they learned that if making the concentration of hydrocarbons flowing into the exhaust purification catalyst 46 vibrate by within a predetermined range of amplitude and within a predetermined range of period, as shown in FIG. 5, an extremely high $NO_x$ purification rate is obtained even in a 400° C. or higher high temperature region.

Figure 6A:
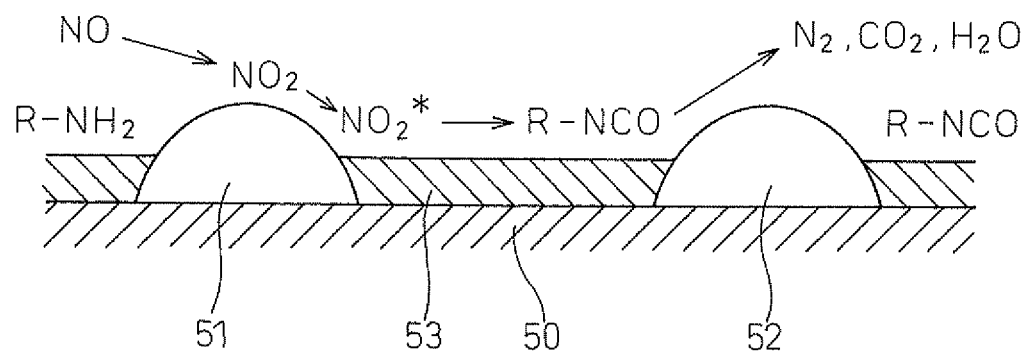
FIGS. 6A and 6B are views for explaining an oxidation reduction reaction in an exhaust purification catalyst.
Figure 6B:
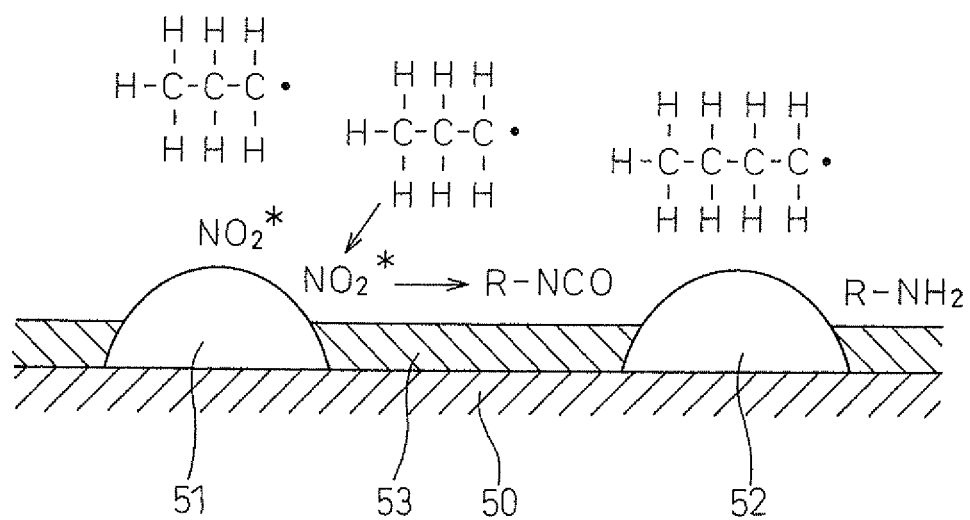

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 46. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 46. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust treatment catalyst 13 is low, while FIG. 6B shows when hydrocarbons are fed from the hydrocarbon feed valve 15 and the concentration of hydrocarbons flowing into the exhaust treatment catalyst 13 becomes high.

Now, as will be understood from FIG. 4, the air-fuel ratio of the exhaust gas which flows into the exhaust treatment catalyst 13 is maintained lean except for an instant, so the exhaust gas which flows into the exhaust treatment catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 15, as shown in FIG. 3, the hydrocarbons are reformed and become radicalized inside of the exhaust purification catalyst 46. As a result, as shown in FIG. 6B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2^*$ is made higher before this predetermined time passes, as shown in FIG. 6B, the active $NO_2^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound $R-NO_2$. If this nitro compound $R-NO_2$ is produced, the result becomes a nitrile compound $R-CN$, but this nitrile compound $R-CN$ can only survive for an instant in this state, so immediately becomes an isocyanate compound $R-NCO$. If this isocyanate compound $R-NCO$ is hydrolyzed, it becomes an amine compound $R-NH_2$. However, in this case, what is hydrolyzed is considered to be part of the isocyanate compound $R-NCO$. Therefore, as shown in FIG. 6B, the majority of the reducing intermediate which is held or adsorbed on the surface of the basic layer 53 is believed to be the isocyanate compound $R-NCO$ and amine compound $R-NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust treatment catalyst 13 is lowered and thereby the oxygen concentration becomes higher, the hydrocarbons around the reducing intermediate will be oxidized. As a result, as shown in FIG. 6A, the reducing intermediate and the active $NO_2^*$ will react. At this time, the active $NO_2^*$ reacts with the reducing intermediate $R-NCO$ or $R-NH_2$ to form $N_2$, $CO_2$, and $H_2O$ and consequently the $NO_x$ is removed.

In this way, in the exhaust purification catalyst 46, by making the concentration of hydrocarbons flowing into the exhaust treatment catalyst 13 higher, a reducing intermediate is produced. By making the concentration of hydrocarbons flowing into the exhaust treatment catalyst 13 lower and raising the oxygen concentration, the active $NO_2^*$ reacts with the reducing intermediate and the $NO_x$ is removed. That is, in order for the exhaust purification catalyst 46 to remove the $NO_x$, the concentration of hydrocarbons flowing into the exhaust treatment catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. That is, it is necessary to make the concentration of hydrocarbons flowing into the exhaust treatment catalyst 13 vibrate by within a predetermined range of amplitude. Note that, in this case, it is necessary to hold a sufficient amount of reducing intermediate R—NCO or R—$NH_2$ on the basic layer 53, that is, the basic exhaust gas flow surface part 24, until the produced reducing intermediate reacts with the active $NO_2^*$. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_2^*$ is absorbed in the basic layer 53 in the form of nitrates without producing a reducing intermediate. To avoid this, it is necessary to make the concentration of hydrocarbons flowing into the exhaust treatment catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 46. To hold the produced reducing intermediate R—NCO or R—$NH_2$ inside the exhaust treatment catalyst 13, a basic exhaust gas flow surface part 54 is formed around the precious metal catalysts 51 and 52. Due to the reducing action of the reducing intermediate R—NCO or R—$NH_2$ which is held on the basic exhaust gas flow surface part 54, the $NO_x$ is reduced. The vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
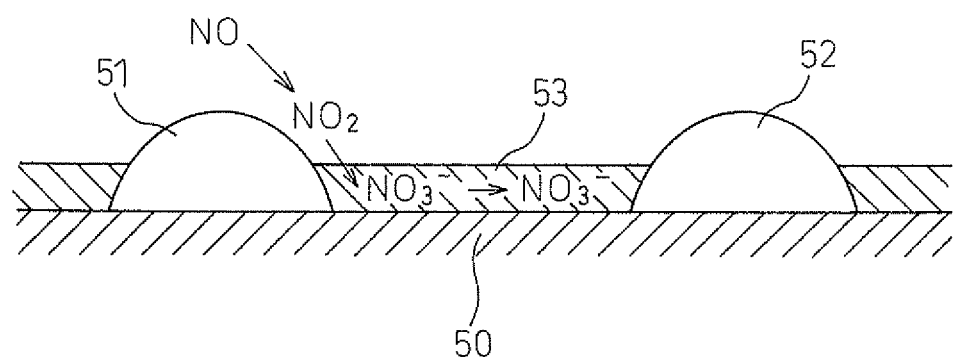
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_2^*$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
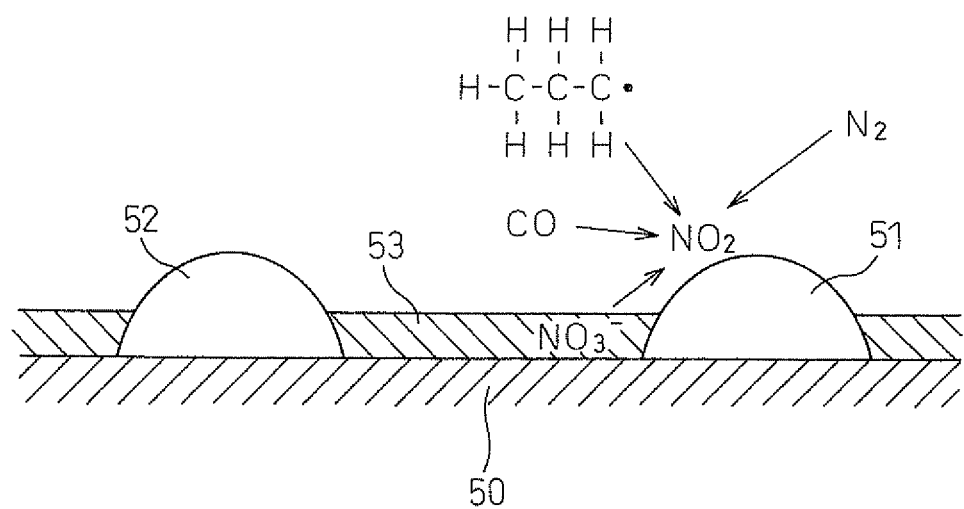

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$) and consequently the nitrates absorbed in the basic layer 53 become nitrate ions $NO_3$) one by one and, as shown in FIG. 7B, are released from the basic layer 53 in the form of $NO_2$. Next, the released $NO_2$ is reduced by the hydrocarbons HC and CO contained in the exhaust gas.

Figure 8:
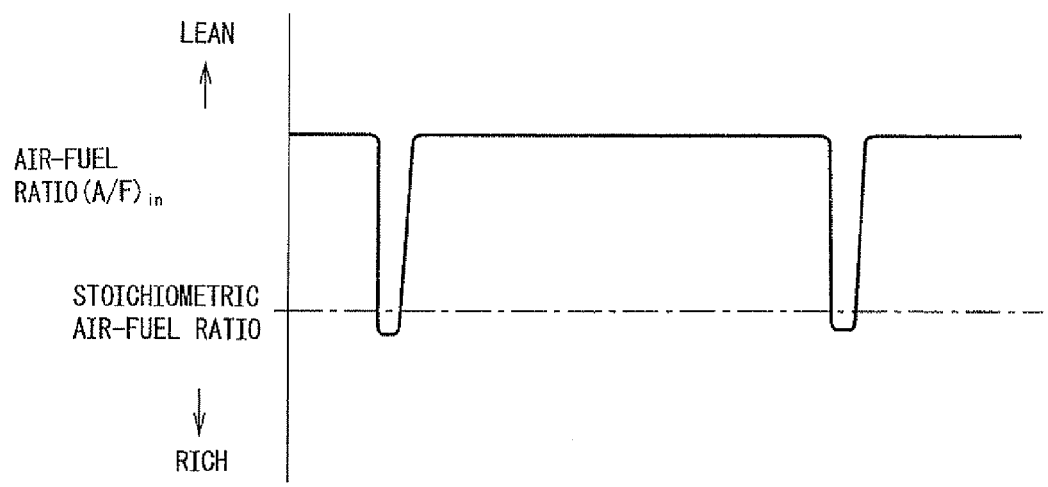
FIG. 8 is a view showing changes in the air-fuel ratio of the exhaust gas flowing into the exhaust treatment catalyst.

FIG. 8 shows the case of making the air-fuel ratio (A/F)in of the exhaust gas which flows into the exhaust treatment catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are fed into the engine intake passage, combustion chambers 2, and exhaust passage upstream of the exhaust treatment catalyst 13 is called the air-fuel ratio of the exhaust gas, the exhaust purification catalyst 46 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
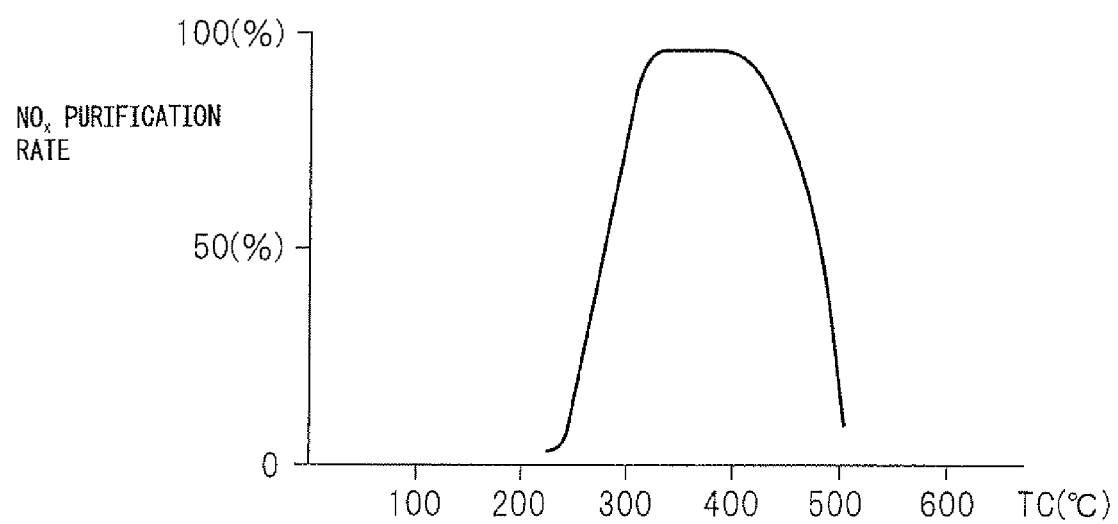
FIG. 9 is a view of an $NO_x$ purification rate.

FIG. 9 shows the $NO_x$ purification rate when making the exhaust purification catalyst 46 function as an $NO_x$ storage catalyst in this way. Note that, the abscissa of the FIG. 9 shows the catalyst temperature TC of the exhaust purification catalyst 46. When making the exhaust purification catalyst 46 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 46. That is, so long as storing $NO_x$ in the form of nitrates, when the catalyst temperature TC is high, it is difficult to obtain a high $NO_x$, purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 46 function as an $NO_x$ storage catalyst.

Next, referring to FIG. 10 to FIG. 15, the new $NO_x$ purification method which is shown in FIG. 4 to FIGS. 6A and 6B will be explained in a bit more detail.

Figure 10:
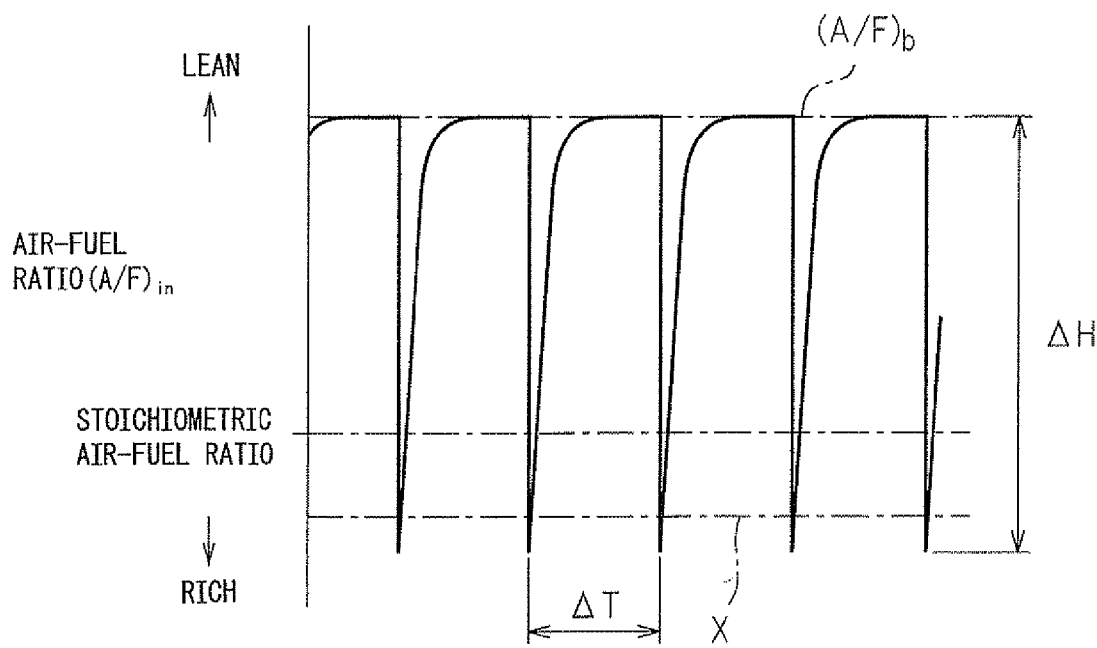
FIG. 10 is a time chart showing changes in the air-fuel ratio of the exhaust gas flowing into the exhaust treatment catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust treatment catalyst 13 simultaneously shows the change in concentration of the hydrocarbons which flow into the exhaust treatment catalyst 13. Note that, in FIG. 10, ΔH shows the amplitude of the change in concentration of hydrocarbons HC which flow into the exhaust treatment catalyst 13, while ΔT shows the vibration period of the concentration of the hydrocarbons which flow into the exhaust treatment catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust treatment catalyst 13 when stopping the feed of hydrocarbons. On the other hand, in FIG. 10, X shows the upper limit of the air-fuel ratio (A/F)in which is used for producing the reducing intermediate without the produced active $NO_2$* being stored in the form of nitrates inside the basic layer 53. To make the active $NO_2$* and the reformed hydrocarbons react and produce the reducing intermediate, it is necessary to make the air-fuel ratio (A/F)in lower than the upper limit X of this air-fuel ratio.

In other words, in FIG. 10, X shows the lower limit of the concentration of hydrocarbons required for making the active $NO_2$* and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2$*, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 46. In this case, the exhaust purification catalyst 46, for example, becomes stronger in oxidizing strength if increasing the carried amount of the precious metal 51 and becomes stronger in oxidizing strength if strengthening the acidity. Therefore, the oxidizing strength of the exhaust purification catalyst 46 changes due to the carried amount of the precious metal 51 or the strength of the acidity.

Figure 11:
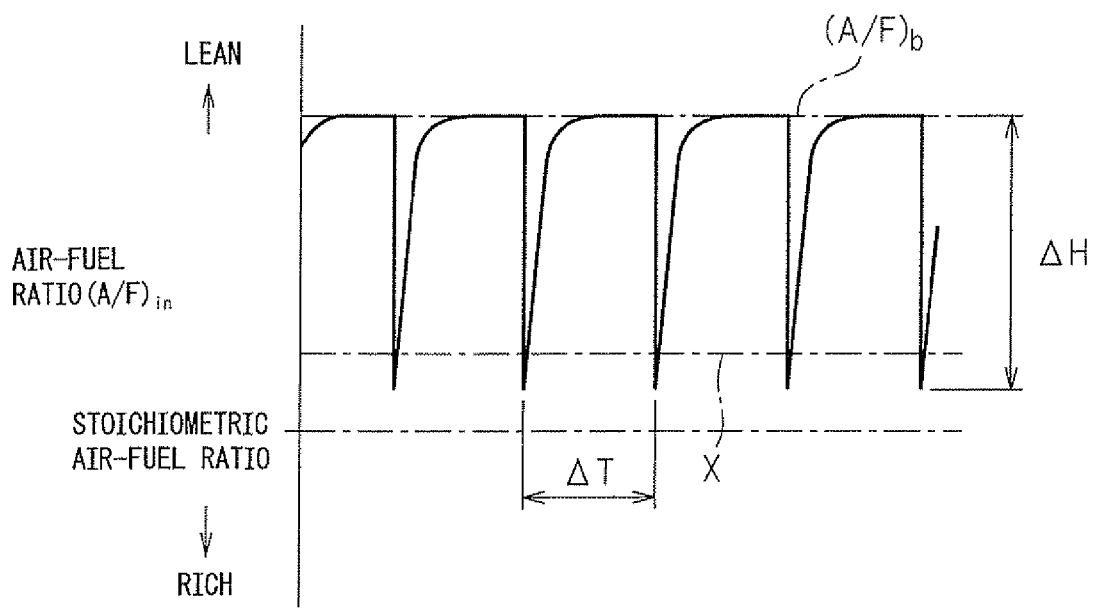
FIG. 11 is a time chart showing changes in the air-fuel ratio of the exhaust gas flowing into the exhaust treatment catalyst.

Now, if using an exhaust purification catalyst 46 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 46 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 46 with a strong oxidizing strength, the demanded minimum air-fuel ratio X has to be made rich.

On the other hand, when using an exhaust purification catalyst 46 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 46 with a weak oxidizing strength, as shown in FIG. 10, if making the air-fuel ratio (A/F)in periodically rich, a large amount of hydrocarbons will be exhausted from the exhaust purification catalyst 46 without being oxidized and consequently the amount of hydrocarbons which is wastefully consumed will increase. Therefore, when using an exhaust purification catalyst 46 with a weak oxidizing strength, the demanded minimum air-fuel ratio X has to be made lean.

Figure 12:
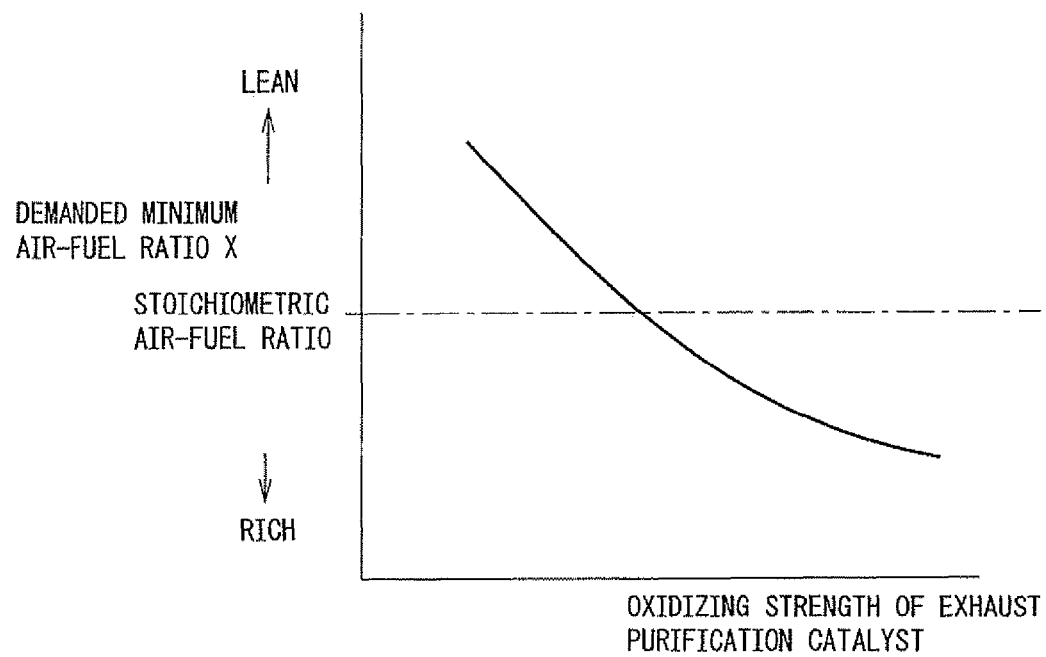
FIG. 12 is a view showing a relationship between an oxidizing strength of an exhaust purification catalyst and a demanded minimum air-fuel ratio X.

That is, it will be understood that the demanded minimum air-fuel ratio X, as shown in FIG. 12, has to be reduced the stronger the oxidizing strength of the exhaust purification catalyst 46 becomes. In this way, the demanded minimum air-fuel ratio X becomes lean or becomes rich by the oxidizing strength of the exhaust purification catalyst 46, but below the case where the demanded minimum air-fuel ratio X is rich will be used as an example to explain the amplitude of the change of the concentration of hydrocarbons flowing into the exhaust treatment catalyst 13 or the vibration period of the concentration of hydrocarbon flowing into the exhaust treatment catalyst 13.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
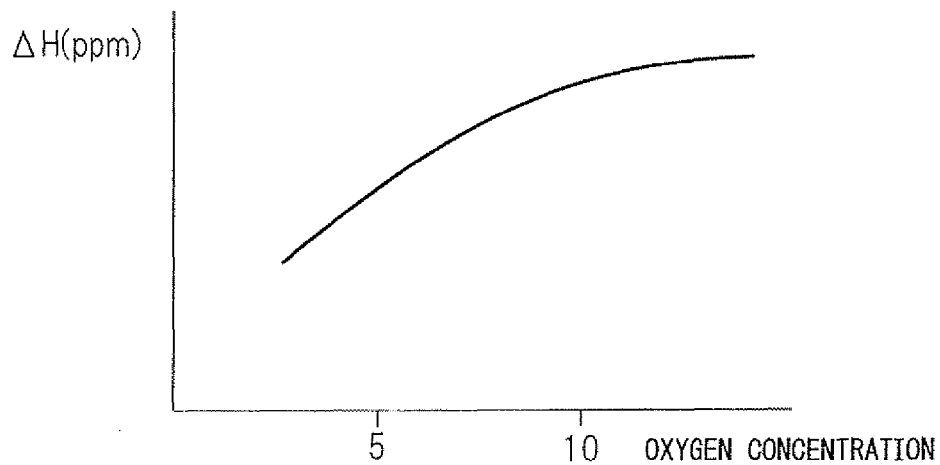
FIG. 13 is a view showing a relationship between an oxygen concentration in exhaust gas and an amplitude $\Delta H$ of a hydrocarbon concentration giving the same $NO_x$ purification rate.

FIG. 13 shows the relationship between the oxygen concentration in the exhaust gas before the hydrocarbons are fed and the amplitude $\Delta H$ of the hydrocarbon concentration when the same $NO_x$ purification rate is obtained. To obtain the same $NO_x$ purification rate from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_x$ purification rate, the higher the base air-fuel ratio (A/F)b, the greater the amplitude $\Delta T$ of the hydrocarbon concentration has to be made. In other words, to remove the $NO_x$ well, the lower the base air-fuel ratio (A/F)b, the more the amplitude $\Delta T$ of the hydrocarbon concentration can be reduced.

Figure 14:
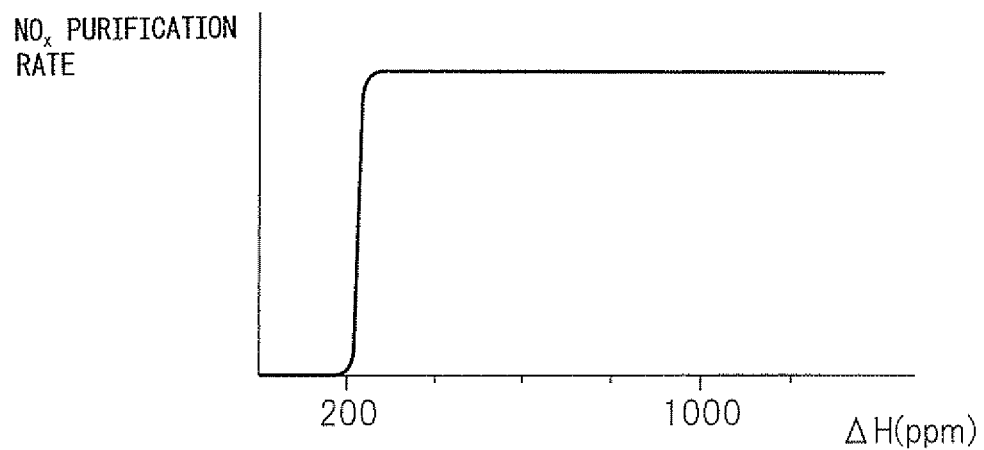
FIG. 14 is a view showing a relationship between an amplitude $\Delta H$ of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it will be understood that when the base air-fuel ratio (A/F)b is the highest, if making the amplitude $\Delta H$ of the hydrocarbon concentration 10000 ppm or so, a good $NO_x$ purification rate is obtained. If the amplitude $\Delta H$ of the hydrocarbon concentration exceeds 10000 ppm, there is the danger that the new $NO_x$ purification method shown from FIG. 4 to FIGS. 6A and 6B will no longer be able to be performed well. Therefore, in the present invention, the predetermined range of the amplitude of the hydrocarbon concentration is made 200 ppm to 10000 ppm.

Figure 15:
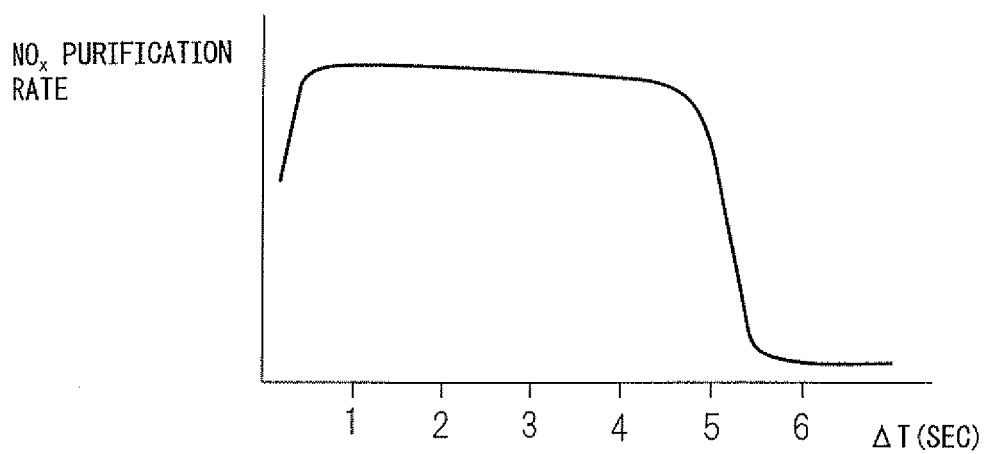
FIG. 15 is a view showing a relationship of a vibration period $\Delta T$ of a hydrocarbon concentration and an $NO_x$ purification rate.

Further, if the vibration period $\Delta T$ of the hydrocarbon concentration becomes longer, the oxygen concentration around the active $NO_2^*$ becomes higher in the time after the hydrocarbons are fed to when the hydrocarbons are next fed. In this case, if the vibration period $\Delta T$ of the hydrocarbon concentration becomes longer than about 5 seconds, the active $NO_2^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 46, therefore, as shown in FIG. 15, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Figure 16:
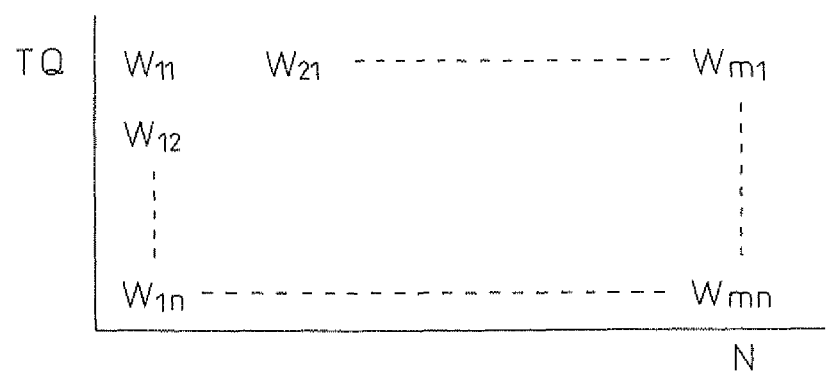
FIG. 16 is a view showing a map of the hydrogen feed amount W.

Now, in an embodiment of the present invention, by changing the injection amount and injection timing of hydrocarbons from the hydrocarbon feed valve 15, the amplitude $\Delta H$ and the vibration period $\Delta T$ of the hydrocarbon concentration are controlled to the optimum values in accordance with the operating state of the engine. In this case, the injection amount W of hydrocarbons which enables a change in the optimal concentration of hydrocarbons in accordance with the engine operating state changes in accordance with the operating state of the engine. In this embodiment according to the present invention, the injection amount of hydrocarbons W is stored as a function of the demanded torque TQ of the engine and the engine speed N in the form of a map such as shown in FIG. 16 in advance in the ROM 32.

Now, the exhaust purification catalyst 46 does not perform an $NO_x$ purification action by the new $NO_x$ purification method explained up to here unless the catalyst 46 is activated. Therefore, in this embodiment according to the present invention, before the exhaust purification catalyst 46 is activated, the feed of hydrocarbons from the hydrocarbon feed valve 15 is stopped. When the exhaust purification catalyst 46 is activated, the feed of hydrocarbons from the hydrocarbon feed valve 15 is started and the new $NO_x$ purification method is used for the $NO_x$ purification action.

In this regard, as explained above, if increasing the feed period of the hydrocarbons, the $NO_x$ in the exhaust gas is stored in the form of nitrates in the basic layer 53. Therefore, even when the feed of hydrocarbons from the hydrocarbon feed valve 15 is stopped such as before activation of the exhaust purification catalyst 46, the $NO_x$ in the exhaust gas is stored in the form of nitrates in the basic layer 53. However, when the exhaust purification catalyst 46 is not activated, the storage action of the $NO_x$ also is not actively performed. Therefore, at this time, the majority of the $NO_x$ which is contained in the exhaust gas is discharged into the atmosphere without being stored in the exhaust purification catalyst 46.

In this way, as a method of keeping $NO_x$ from being exhausted into the atmosphere, it may be considered to arrange an $NO_x$ absorption catalyst which can adsorb $NO_x$ contained in exhaust gas at the upstream side of the exhaust treatment catalyst 13 or downstream side. The amount of $NO_x$ which this $NO_x$ absorption catalyst can absorb generally speaking has a characteristic such as shown by the solid line in FIG. 17 with respect to the temperature TB of the $NO_x$ absorption catalyst. That is, the amount of $NO_x$ which the $NO_x$ absorption catalyst can absorb increases if the temperature TB of the $NO_x$ absorption catalyst becomes lower. Further, the $NO_x$ absorption catalyst has a maximum temperature $TB_0$ at which the $NO_x$ can be adsorbed. If the temperature TB of the $NO_x$ absorption catalyst exceeds this maximum temperature $TB_0$, the $NO_x$ absorption catalyst can soon no longer adsorb $NO_x$ any more.

In this way, the $NO_x$ absorption catalyst can adsorb a large amount of $NO_x$ when the catalyst temperature TB is low. Therefore, if arranging the $NO_x$ absorption catalyst at the upstream side of the exhaust treatment catalyst 13, it would appear that the $NO_x$ contained in exhaust gas could be adsorbed at the $NO_x$ absorption catalyst before the exhaust purification catalyst 46 becomes activated. However, if arranging an $NO_x$ absorption catalyst at the upstream side of the exhaust treatment catalyst 13, high boiling point hydrocarbons with large carbon numbers contained in the exhaust gas will stick to the surface of the $NO_x$ absorption catalyst, that is, HC poisoning will occur, therefore, $NO_x$ will end up being unable to be adsorbed. Therefore, it is not possible to arrange an $NO_x$ absorption catalyst at the upstream side of the exhaust treatment catalyst 13.

Figure 17:
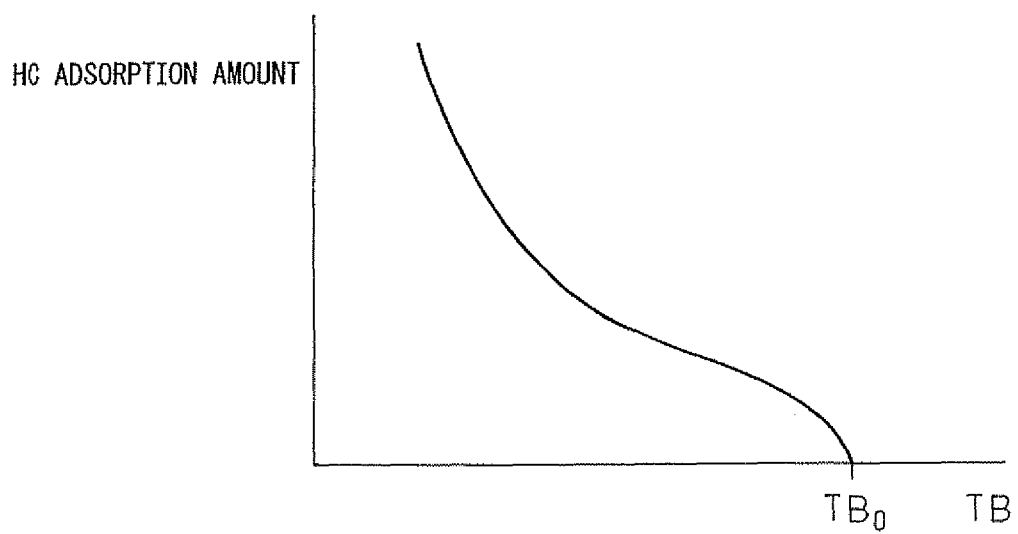
FIG. 17 is a view showing a relationship between a temperature of an HC absorption catalyst and an HC adsorption amount.

On the other hand, in an $NO_x$ absorption catalyst, as will be understood from FIG. 17, generally speaking, if the catalyst temperature TB rises, the amount of $NO_x$, which can be adsorbed decreases. Therefore, if the catalyst temperature TB rises, the $NO_x$ which now is unable to be adsorbed is desorbed from the $NO_x$ absorption catalyst. However, if arranging an $NO_x$ absorption catalyst at the downstream side of the exhaust treatment catalyst 13, there would be no means for reducing the $NO_x$ which is desorbed from the exhaust purification catalyst 46. Therefore, in this case, the desorbed $NO_x$ will be exhausted into the atmosphere. Therefore, an $NO_x$ absorption catalyst cannot be arranged at the downstream side of the exhaust treatment catalyst 13.

Figure 18:
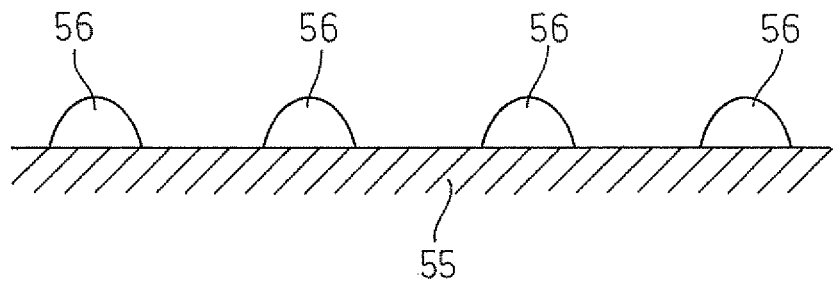
FIG. 18 is a view schematically showing a surface part of a catalyst carrier of an HC absorption catalyst.

Therefore, in the present invention, the bottom coat layer 47 of the exhaust treatment catalyst 13 is formed from an $NO_x$ absorption catalyst. This bottom coat layer 47 is also comprised of a powder aggregate. FIG. 18 schematically shows the surface part of the catalyst carrier of the powder forming this $NO_x$ absorption catalyst 47. As shown in FIG. 18, in this $NO_x$ absorption catalyst 47, for example, silver Ag, copper Cu, iron Fe, or other such base metal catalyst 56 is carried on a catalyst carrier 55 made of alumina. Note that, in the embodiment shown in FIG. 18, this base metal catalyst 56 is comprised of silver Ag. Further, as will be understood from FIG. 18, the catalyst carrier 55 does not carry any precious metal catalyst.

Figure 19A:
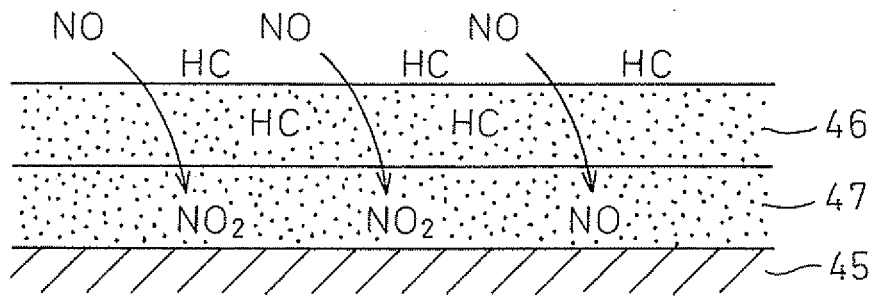
FIG. 19A and FIG. 19B are views for explaining adsorption and desorption actions of $NO_x$.

This $NO_x$ absorption catalyst 47 also has the function of adsorbing $NO_x$ at a low temperature. Therefore, before the exhaust purification catalyst 46 is activated, the NO contained in the exhaust gas is adsorbed as NO or in the form of $NO_2$ after being oxidized on the catalyst 56 and adsorbed on the catalyst 56 or on the catalyst carrier 55. That is, at this time, the hydrocarbons HC which are contained in exhaust gas, as shown in FIG. 19A, stick to the top coat layer 46 which covers the $NO_x$ absorption catalyst 47, that is, the exhaust purification catalyst 46. That is, the hydrocarbons HC are trapped by the top coat layer 46. Therefore, the $NO_x$ absorption catalyst 47 is no longer subjected to HC poisoning, therefore at this time, the NO which is contained in the exhaust gas is adsorbed well in the form of NO or $NO_2$ inside of the $NO_x$ absorption catalyst 47.

Figure 19B:
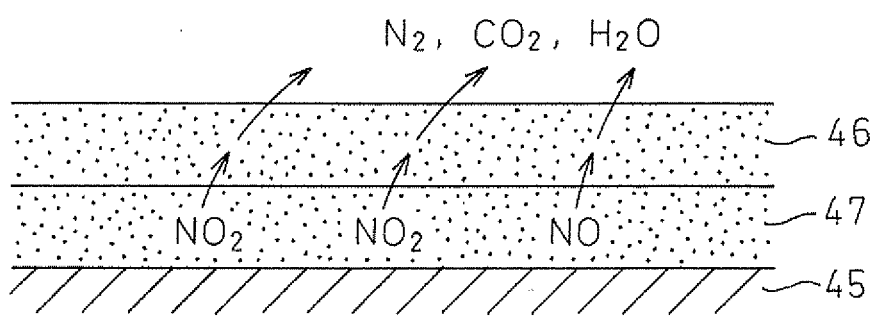

On the other hand, around when the exhaust purification catalyst 46 becomes activated, preferably after the exhaust purification catalyst 46 is activated, the NO or $NO_2$, that is, the $NO_x$ which is adsorbed at the $NO_x$ absorption catalyst 47 is desorbed from the $NO_x$ absorption catalyst 47. This desorbed $NO_x$, as shown in FIG. 19B, diffuses into the exhaust purification catalyst 46. At this time, the exhaust purification catalyst 46 holds the produced reducing intermediate. The $NO_x$ which is desorbed from the $NO_x$ absorption catalyst 47 reacts with the reducing intermediate and is made into $N_2$, $CO_2$, and $H_2O$.

In this case, the $NO_x$ which was desorbed from the $NO_x$ absorption catalyst 47 meets with the reducing intermediate by an almost 100% probability, so the desorbed $NO_x$ is almost completely reduced. Therefore, there is almost no danger of the $NO_x$ which was desorbed from the $NO_x$ absorption catalyst 47 being exhausted into the atmosphere. Note that the hydrocarbons HC which were trapped by the exhaust purification catalyst 46 are oxidized at the exhaust purification catalyst 46 or are used for producing the reducing intermediate.

In this way, in the present invention, an exhaust treatment catalyst 13 is arranged inside of an engine exhaust passage, a coat layer comprised of at least two layers of a top coat layer 46 and a bottom coat layer 47 is formed on a substrate 45 of the exhaust treatment catalyst 13, the top coat layer 46 is comprised of an exhaust purification catalyst for reacting $NO_x$ contained in exhaust gas and reformed hydrocarbons, a precious metal catalyst 51, 52 is carried on an exhaust gas flow surface of the exhaust purification catalyst 46 and a basic exhaust gas flow surface part 54 is formed around the precious metal catalyst 51, 52, the exhaust purification catalyst 46 has the property of reducing the $NO_x$ which is contained in exhaust gas if the concentration of hydrocarbons flowing into the exhaust treatment catalyst 13 is made to vibrate within a predetermined range of amplitude and within a predetermined range of period and has the property of being increased in storage amount of $NO_x$ which is contained in exhaust gas if a vibration period of the hydrocarbon concentration is made longer than the predetermined range, the bottom coat layer 47 is comprised of an $NO_x$ absorption catalyst which adsorbs $NO_x$ contained in exhaust gas and desorbs the adsorbed $NO_x$ if the temperature rises, at the time of engine operation, the concentration of hydrocarbons flowing into the exhaust treatment catalyst 13 is made to vibrate within the predetermined range of amplitude and within the predetermined range of period and, thereby, $NO_x$ contained in exhaust gas and $NO_x$ desorbed from the $NO_x$ absorption catalyst are reduced.

In this case, in the present invention, the $NO_x$ reduction treatment which makes the concentration of hydrocarbons flowing into the exhaust treatment catalyst 13 vibrate for reducing the $NO_x$ is started after the exhaust purification catalyst 46 is activated and the $NO_x$ contained in exhaust gas is adsorbed at the $NO_x$ absorption catalyst 47 before the exhaust purification catalyst 46 is activated.

FIG. 20 shows the routine for control of the feed of hydrocarbons from the hydrocarbon feed valve 15.

Referring to FIG. 20, first, at step 60, the temperature of the exhaust treatment catalyst 13, that is, the temperature TC of the exhaust purification catalyst 46, is estimated from the output signal of the temperature sensor 23. Next, at step 61, it is judged if the temperature TC of the exhaust purification catalyst 46 exceeds the predetermined activation temperature $TC_0$ shown in FIG. 5. When $TC \leq TC_0$, that is, when the exhaust purification catalyst 46 is not activated, the processing cycle is ended. At this time, the feed of hydrocarbons from the hydrocarbon feed valve 15 is stopped.

As opposed to this, when it is judged at step 61 that $TC > TC_0$, that is, when the exhaust purification catalyst 46 is activated, the routine proceeds to step 62 where the injection amount W of hydrocarbons is calculated from the map shown in FIG. 16. Next, at step 63, hydrocarbons of the calculated injection amount W is injected from the hydrocarbon feed valve 15 at predetermined time intervals, for example, every 3 seconds.

Note that, to reduce well the $NO_x$ which is desorbed from the $NO_x$ absorption catalyst 47, it is preferable that the exhaust purification catalyst 46 be activated when desorbing $NO_x$ from the $NO_x$ absorption catalyst 47. That is, it is preferable that the maximum temperature $TB_0$ at which the $NO_x$ absorption catalyst 47 can adsorb $NO_x$ shown in FIG. 17 be higher than the activation temperature $TC_0$ of the exhaust purification catalyst 46. Therefore, in this embodiment according to the present invention, the $NO_x$ absorption catalyst 47 is formed so that the maximum temperature $TB_0$ of the $NO_x$ absorption catalyst 47 becomes higher than activation temperature $TC_0$ of the exhaust purification catalyst 46. In this case, for example, by adding some alkali metal, alkali earth metal, or ceria $CeO_2$ to the $NO_x$ absorption catalyst 47, it is possible to raise the maximum temperature $TB_0$ of the $NO_x$ absorption catalyst 47.

Note that if an active oxidation reaction occurs in the $NO_x$ absorption catalyst 47 before the exhaust purification catalyst 46 is activated, the heat of the oxidation reaction will cause the $NO_x$ absorption catalyst 47 to rise in temperature. As a result, there is a danger of a large amount of $NO_x$ being desorbed from the $NO_x$ absorption catalyst 47. Therefore, in this embodiment according to the present invention, to prevent an active oxidation reaction from occurring inside the $NO_x$ absorption catalyst 47, as explained above, the $NO_x$ absorption catalyst 47 is kept from including any precious metal.

Figure 21:
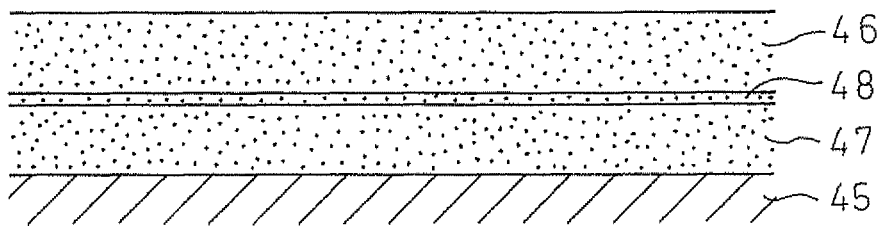
FIG. 21 is a view schematically showing a surface part of a substrate of an exhaust treatment catalyst showing another embodiment.

FIG. 21 shows another embodiment of the exhaust treatment catalyst 13. In this embodiment, to prevent the temperature of the $NO_x$ absorption catalyst 47 from rising when the exhaust purification catalyst 46 is not activated, a heat insulating layer 48 is formed between the top coat layer 46 and the bottom coat layer 47. That is, if providing such a heat insulating layer 48, when the exhaust purification catalyst 46 starts activating and the temperature rises, the temperature rise of the $NO_x$ absorption catalyst 47 is suppressed, therefore it is possible to make $NO_x$ desorb from the $NO_x$ absorption catalyst 47 after the exhaust purification catalyst 46 is activated. Note that, this heat insulating layer 48 may be formed from silicon carbide SiC or alumina $Al_2O_3$.

Figure 22:
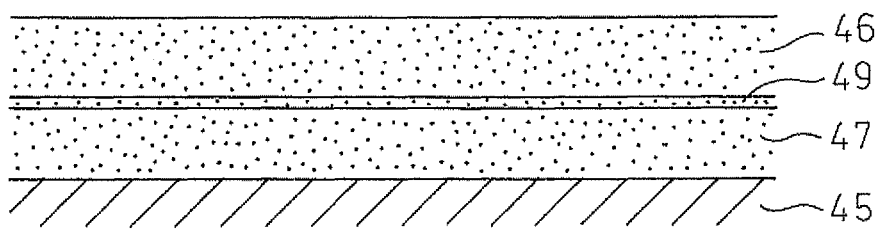
FIG. 22 is a view schematically showing a surface part of a substrate of an exhaust treatment catalyst showing still another embodiment.
Figure 23:
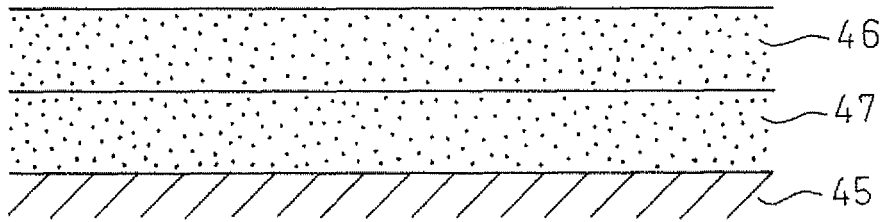
FIG. 23 is a view schematically showing a surface part of a substrate of an exhaust treatment catalyst showing still another embodiment.

FIG. 22 and FIG. 23 show an embodiment designed to block the $NO_x$ absorption catalyst 47 from HC poisoning and thereby enable the $NO_x$ absorption catalyst 47 to perform a good $NO_x$ adsorption action. That is, in the embodiment shown in FIG. 22, between the top coat layer 46 and the bottom coat layer 47, an HC trap layer 49 comprised of, for example, zeolite, is formed. In this embodiment, hydrocarbons heading from the top coat layer 46 to the bottom coat layer 47 are trapped inside the HC trap layer 49, therefore the $NO_x$ storage catalyst 47 is blocked from HC poisoning.

In the embodiment shown in FIG. 23, a powder of for example zeolite having the ability to trap HC is mixed inside the top coat layer 46. That is, in this embodiment, the top coat layer 46 has an HC trap function. Due to this HC trap function, the $NO_x$ absorption catalyst 47 is blocked from HC poisoning. Note that, in the embodiment shown in FIG. 21, one or both of the top coat layer 46 and heat insulating layer 48 can be given an HC trap function.

Further, as another embodiment, it is also possible to arrange an oxidation catalyst upstream of the exhaust treatment catalyst 13 inside of the engine exhaust passage so as to reform the hydrocarbons.

REFERENCE SIGNS LIST

4 . . . intake manifold
5 . . . exhaust manifold
7 . . . exhaust turbocharger
12 . . . exhaust pipe
13 . . . exhaust treatment catalyst
14 . . . particulate filter
15 . . . hydrocarbon feed valve
45 . . . substrate
46 . . . exhaust purification catalyst
47 . . . $NO_x$ absorption catalyst
50 . . . catalyst carrier
51, 52 . . . precious metal catalyst
53 . . . basic layer
55 . . . catalyst carrier
56 . . . base metal catalyst

The invention claimed is:

1. An exhaust purification system of an internal combustion engine comprising:
an engine exhaust passage;
an exhaust treatment catalyst arranged inside of the engine exhaust passage;
a coat layer formed on a substrate of the exhaust treatment catalyst, wherein
the coat layer comprises at least a top coat layer and a bottom coat layer, wherein
the top coat layer is comprised of an exhaust purification catalyst for reacting $NO_x$ contained in exhaust gas and reformed hydrocarbons, wherein a precious metal catalyst is carried on an exhaust gas flow surface of the exhaust purification catalyst and a basic exhaust gas flow surface part is formed around the precious metal catalyst, and
the bottom coat layer is comprised of an $NO_x$ absorption catalyst that adsorbs $NO_x$ contained in exhaust gas and desorbs the adsorbed $NO_x$ if a temperature of the bottom coat layer rises; and
an electronic control unit, wherein the electronic control unit is configured to control a vibration of a concentration of hydrocarbons flowing into the exhaust treatment catalyst within a predetermined range of amplitude and within a predetermined range of period, and is configured to control the vibration period of the hydrocarbon concentration longer than the predetermined range of period, wherein
when the electronic control unit controls the vibration of the concentration of hydrocarbons flowing into the exhaust treatment catalyst within the predetermined range of amplitude and within the predetermined range of period, the exhaust purification catalyst has a property of producing a reducing intermediate containing nitrogen and hydrocarbons that chemically reduces the $NO_x$ contained in the exhaust and/or $NO_x$ desorbed from the $NO_x$ absorption catalyst by a reducing action of the produced reducing intermediate, and the exhaust purification catalyst chemically reduces the $NO_x$ that is contained in exhaust gas and/or $NO_x$ desorbed from the $NO_x$ absorption catalyst without storing, or storing a fine amount of nitrates in the basic exhaust gas flow surface part, and
when the electronic control unit controls the vibration period of the hydrocarbon concentration longer than the predetermined range of period, the exhaust treatment catalyst has a property of being increased in storage amount of $NO_x$ that is contained in exhaust gas.

2. The exhaust purification system of an internal combustion engine as claimed in claim 1, wherein the electronic control unit is configured to control the vibration of a concentration of hydrocarbons flowing into the exhaust treatment catalyst within the predetermined range of amplitude and within the predetermined range of period after the exhaust purification catalyst is activated, wherein
$NO_x$ contained in exhaust gas is adsorbed at the $NO_x$ absorption catalyst before the exhaust purification catalyst is activated.

3. The exhaust purification system of an internal combustion engine as claimed in claim 2, wherein the $NO_x$ absorption catalyst has a maximum temperature at which it can adsorb $NO_x$, and wherein the $NO_x$ absorption catalyst is formed so that the maximum temperature of the $NO_x$ absorption catalyst is higher than an activation temperature of the exhaust purification catalyst.

4. The exhaust purification system of an internal combustion engine as claimed in claim 1, wherein inside the exhaust purification catalyst, $NO_x$ contained in exhaust gas and reformed hydrocarbons are reacted to produce the reducing intermediate containing nitrogen and hydrocarbons, and wherein the predetermined vibration period of the hydrocarbon concentration is a vibration period necessary for continued production of the reducing intermediate.

5. The exhaust purification system of an internal combustion engine as claimed in claim 4, wherein the predetermined vibration period of the hydrocarbon concentration is 0.3 second to 5 seconds.

6. The exhaust purification system of an internal combustion engine as claimed in claim 5, wherein the predetermined range of the amplitude of the hydrocarbon concentration is 200 ppm to 10000 ppm.

7. The exhaust purification system of an internal combustion engine as claimed in claim 1, wherein a basic layer containing an alkali metal, an alkali earth metal, a rare earth, or a metal that can donate electrons to $NO_x$ is formed on the exhaust gas flow surface of the exhaust purification catalyst, and wherein the surface of the basic layer forms the basic exhaust gas flow surface part.

8. The exhaust purification system of an internal combustion engine as claimed in claim 1, wherein the precious metal catalysts are comprised of platinum (Pt) and at least one of rhodium (Rh) or palladium (Pd), and wherein the $NO_x$ absorption catalyst does not contain a precious metal catalyst.

9. The exhaust purification system of an internal combustion engine as claimed in claim 1, wherein a heat insulating layer is formed between the top coat layer and the bottom coat layer.

10. The exhaust purification system of an internal combustion engine as claimed in claim 1, wherein an HC trap layer is formed between the top coat layer and the bottom coat layer, or an HC trap function is given to the top coat layer.

* * * * *